United States Patent
Zabroda

(10) Patent No.: US 7,176,823 B2
(45) Date of Patent: Feb. 13, 2007

(54) GIGABIT ETHERNET LINE DRIVER AND HYBRID ARCHITECTURE

(75) Inventor: Oleksiy Zabroda, Kanata (CA)

(73) Assignee: STMicroelectronics, Inc., Carrollton, TX (US)

( * ) Notice: Subject to any disclaimer, the term of this patent is extended or adjusted under 35 U.S.C. 154(b) by 737 days.

(21) Appl. No.: 10/299,273

(22) Filed: Nov. 19, 2002

(65) Prior Publication Data

US 2004/0096005 A1     May 20, 2004

(51) Int. Cl.
  *H03M 1/66* (2006.01)
(52) U.S. Cl. ...................... 341/144; 375/294
(58) Field of Classification Search ............... 341/144, 341/153; 375/286–289, 295–297
  See application file for complete search history.

(56) References Cited

U.S. PATENT DOCUMENTS

| 6,411,647 B1* | 6/2002 | Chan ........................... 375/216 |
| 6,844,837 B1* | 1/2005 | Sutardja et al. ............. 341/144 |
| 2003/0032394 A1* | 2/2003 | Westra et al. ................. 455/78 |
| 2003/0219111 A1* | 11/2003 | Frey ...................... 379/387.01 |

OTHER PUBLICATIONS

Roo, P.; A CMOS transceiver analog front-end for gigabit ethernet over CAT-5 cables; IEEE International Solid-State Circuits Conference, 2001. Digest of Technical Papers. ISSCC. 2001; Feb. 5-7, 2001 pp. 310-311, 458□□.*

* cited by examiner

*Primary Examiner*—Howard L. Williams
(74) *Attorney, Agent, or Firm*—Lisa K. Jorgenson; Andre M. Szuwalski

(57) ABSTRACT

A gigabit ethernet line driver includes a transmitter having both transmitter and active hybrid outputs. The transmitter consists of a plurality of transmitter clusters each connected to both the transmitter and active hybrid outputs. Each transmitter cluster includes a plurality of transmitter cells consisting of a driver cell and digital to analog converter connected to driver cell. A hybrid circuit connects between the transmitter outputs and receiver inputs for separating a receiver signal from the transmitter signal responsive to a tuning signal.

15 Claims, 12 Drawing Sheets

GIGABIT ETHERNET LINE DRIVER AND HYBRID ARCHITECTURE

BACKGROUND OF THE INVENTION

1. Technical Field of the Invention

The present invention relates to ethernets, and more particularly, to gigabit ethernet line drivers.

2. Description of the Related Art

Ethernet standards 10BASE-T and 100BASE-TX have become dominant in Local Area Networks (LAN) applications due to the low cost and wide use of transmission media based on unshielded twisted pair cable (UTP). The development of these standards has resulted in an emerging 1000BASE-T standard, which provides a significantly higher data transmission rate. The higher transmission rate has been achieved not only by doubling the number of cables of the transmission lines, but by also implementing a full duplex transmission mode with multi-level signaling.

Compared to the above-mentioned standards these features have dramatically changed the parameter requirements of the receiver and the transmitter. The multilevel signaling requires substantially more linear performance and lower noise generation from both the transmitter and the receiver. Full duplex operation requires an accurate hybrid to separate the received signal from the transmitted one at the input of the receiver. The hybrid output still contains some leftovers from the transmitted signal as well as additional signals reflected from different parts of the cable and cross talk signals coming from other cables. All these signals known as echoes are usually removed from the received signal by a DSP echo canceller incorporated in the receive path of the transceiver. The effective operation of the echo canceller depends on the level of non-linear distortions and noise generated in the analog portion of the transmit and receive path of the transceiver. Hence not only the hybrid should be added to the analog blocks used in the earlier standards, but the parameters of the existing blocks need to be substantially improved to be suitable for 1000BASE-T standard.

One possible solution is presented in U.S. Pat. No. 6,259,745. The driver is made of a plurality of switchable current Digital-to-Analog converter (DAC) cells. In order to reduce the high frequency noise generated by the combination of the current switches and the parasitic inductance and capacitance of the chip package and the transformer, the driver output should be filtered. Because the driver produces a significant current, and the input impedance of the transformer connected to the transmission line together with the matching resistance is just a few tens of Ohms, the capacitance of the driver output filter must be very large and is not well suited for location in the transceiver chip. The hybrid is created as a smaller replica driver, which produces a current proportional to the current of the driver. The hybrid current is applied to a pair of resistors connected to the driver outputs. This partially cancels the transmitted signal voltage at the receiver input. In this architecture, the hybrid is controlled by the same digital input and clock used in the driver portion of the transceiver. To get a good compensation of the transmitted signal the hybrid output filter should be well matched with the output filter of the driver.

A different solution is proposed by Roo, et al., "A CMOS Transceiver Analog Front-End for Gigabit Ethernet Over CAT-5 Cables,"2001 IEEE International Solid-State Circuit Conference, Session 19, Digest of Technical Papers. page 310 (2001). In this driver, a DAC is coupled to the transformer through a current mirror with a substantial current gain. This enables the use of smaller filter capacitors on the DAC output. The active hybrid transistors have their gates connected to the same current mirror and better match the hybrid frequency response with the one of the driver. However, because of the nonlinear behavior of the MOS transistor transconductance, the charge accumulated at the filter capacitors together with the gate capacitors of the transistors introduces substantial distortions into dynamic behavior of the transmitted signal. The trajectories of the driver output are not quite proportional for the signals of different amplitude. This can be considered as non-linear distortions. Although the gates of the hybrid transistors are connected to the gates of the driver transistors, the distortions of the transmitted signal leak into the receive path because of an imperfect match of the hybrid and driver. It creates a problem for a DSP echo canceller to remove this part of the echo. Because the canceller is usually a linear device, the distortions lift up the noise level and reduce the signal to noise ratio.

To reduce the non-linear distortions in the driver, the driver output transistor transconductance linearity must be improved. It can be done by increasing the operating current and introducing degenerating resistors to the MOS transistors source nodes. This leads to substantial loss of the power efficiency of the driver. Thus, there is a need for a power efficient driver with low-level, non-linear distortions for 1000BASE-T application.

SUMMARY OF THE INVENTION

The present invention overcomes the foregoing and other problems with a gigabit ethernet line driver consisting of a transmitter and hybrid circuit. The transmitter includes the transmit signal output and active hybrid signal output, and includes a plurality of transmitter clusters connected both to the transmit and active hybrid outputs. Each transmitter cluster includes a plurality of transmitter cells, consisting of a driver cell and a digital to analog converter connected to the driver cell. The hybrid circuit is connected between the transmitter outputs and the receiver inputs to separate a receiver signal from a transmitter signal. The hybrid circuit is responsive to a tuning signal provided by a hybrid tuner.

In a first embodiment, the hybrid circuit consists of first and second resistor strings connected between the receiver inputs and the transmitter outputs. A plurality of transistor switches are connected to taps of each of the first and second resistor strings, and a decoder selects a pair of the transistor switches to connect to a particular tap that provides a current to compensate for a transmitted signal at the receiver inputs. In a second embodiment, the hybrid includes first and second resistors connected between the transmitter outputs and the receiver input. First and second tunable current mirrors are coupled to the receiver inputs and each of the first and second resistors to provide an adjustable compensation current, responsive to a control signal to compensate for a transmitted signal at the receiver inputs.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION

Figure 1:
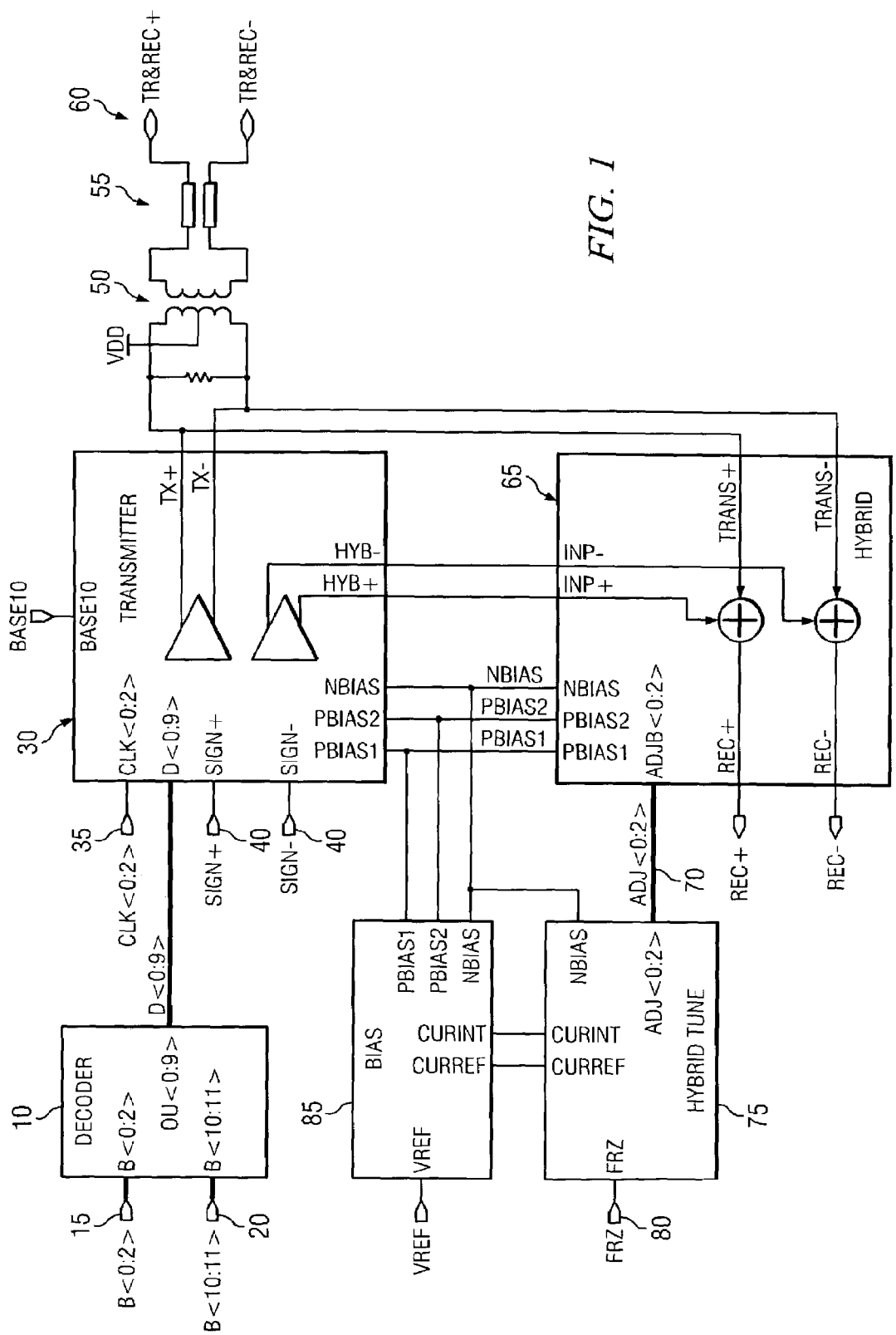
FIG. 1 is a block diagram of a driver and hybrid having true linearity according to the present invention.

Referring to the drawings and more particularly FIG. 1, there is illustrated a block diagram of a driver and hybrid with improved linearity according to the present invention. The device includes a decoder 10, which converts input data bits 15, 20 into a temperature code used in the D/A converter of the transmitter 30. Multi-phase clock 35 and sign representing bits 40 are directly connected to the transmitter 30. The output of the transmitter 30 is connected to transformer 50. The secondary coil of the transformer 50 is connected to a twisted pair cable 55. The other end 60 of the twisted pair cable 55 is to connect to a similar transceiver (not shown). The outputs of the transmitter 30 are connected to active hybrid 65, which separates the signal received from the cable 55 from the signal generated by the transmitter 30. The hybrid 65 contains resistors tuned by the digital output 70 of hybrid tuner 75. This is necessary because in a standard digital semiconductor CMOS process, the resistors usually do not have sufficient precision. The output of the hybrid tuner block 75 can be frozen by input 80 to avoid glitches in the hybrid 65 performance during the active transmit/receive mode. Bias generator 85 produces bias voltages for the other blocks or the driver. The bias generator 85 receives a stable reference voltage 90 from a band gap reference generator, which is not shown.

Figure 2:
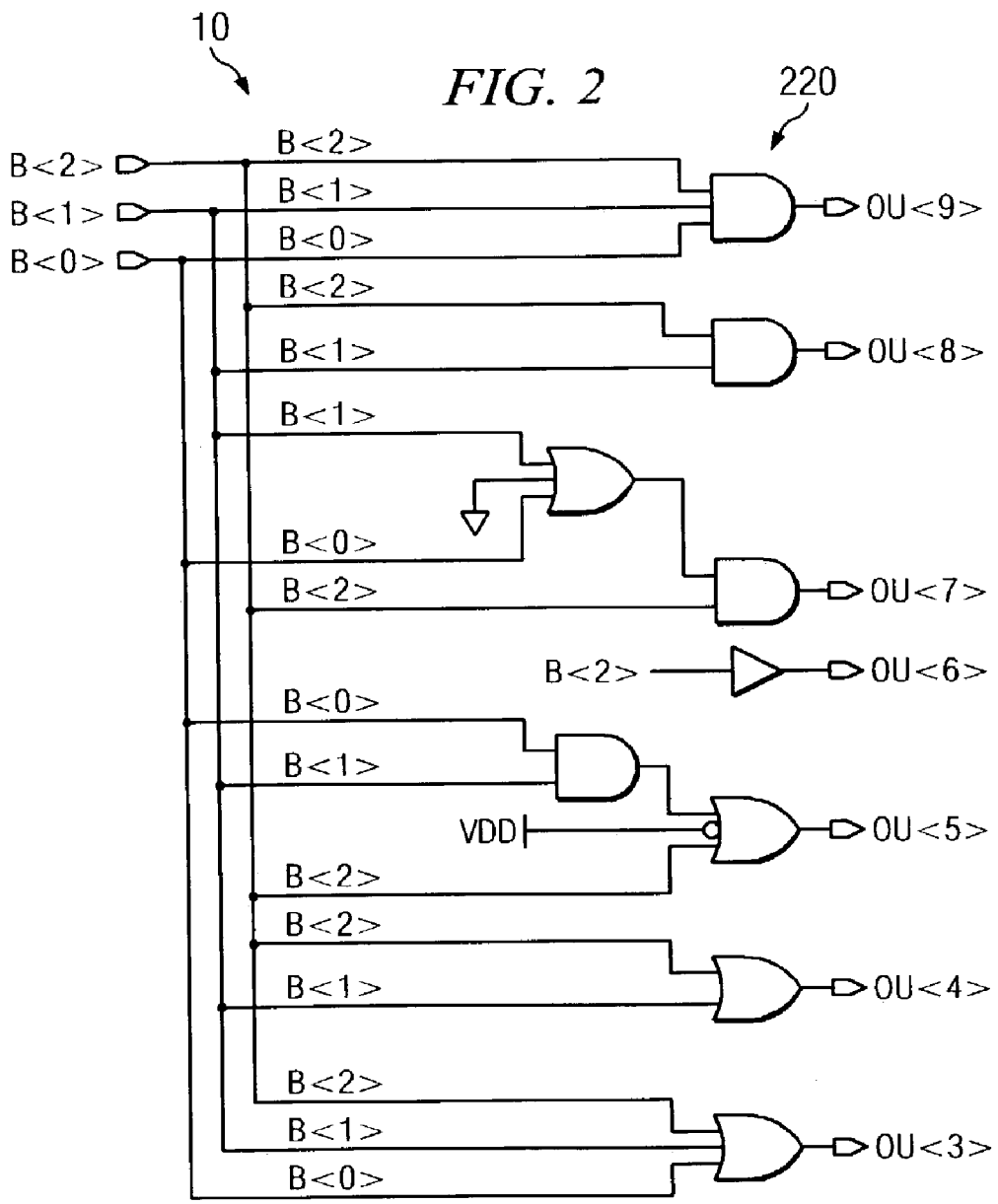
FIG. 2 is a block diagram of a transmitter decoder.
Figure 2:
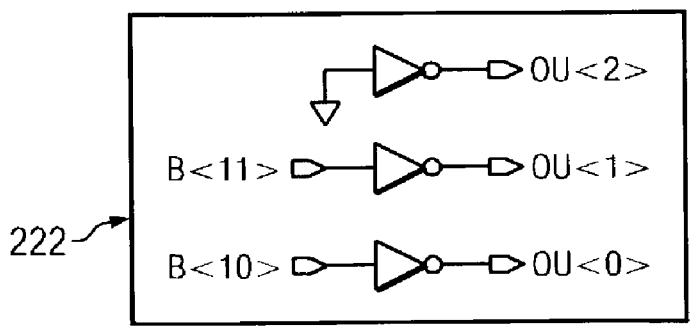

The block-diagram of transmitter decoder 10 is shown in FIG. 2. The decoder 10 contains circuitry 220 for converting a three bit code B<0:2> into an eight bit thermometer code output OU<2:9> used by the most significant bit part of the transmitter 30, and a 10BASE-T least significant bit decoder portion 222, which just inverts the input bits B<10:11>. The decoder 10 generates the code, which controls only the absolute value of the signal transmitted by the transmitter 30. The sign bits are applied to the transmitter 30 directly.

Figure 3:
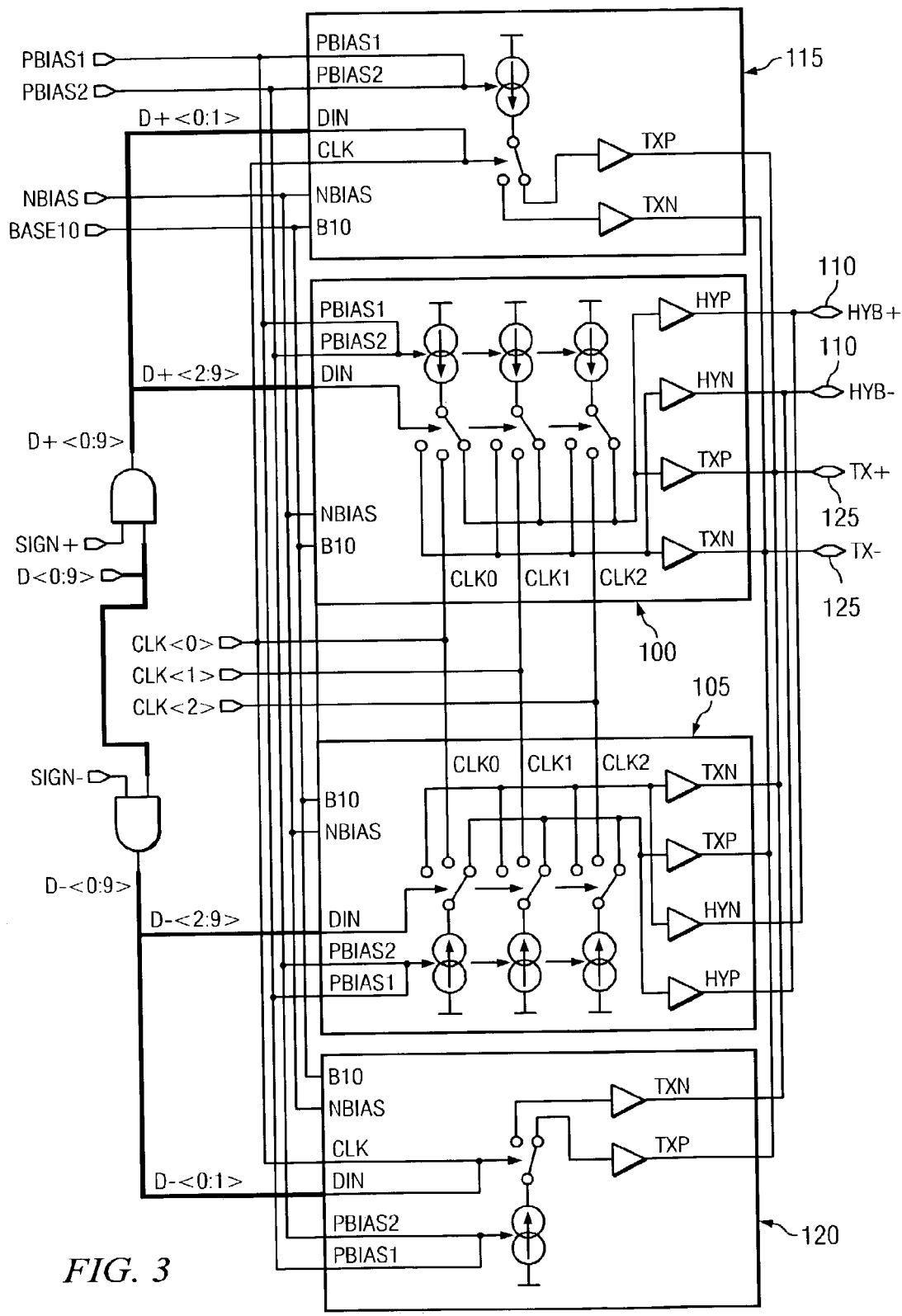
FIG. 3 is a block diagram of a transmitter.

The transmitter 30 block diagram is shown in FIG. 3. The transmitter 30 contains a plurality of transmitter clusters 100, 105. Transmitter cluster 100 is active when the transmitter 30 is generating a positive output, and transmitter cluster 105 is active if the output is negative. The number of transmitter clusters 100, 105 is equal to the number of voltage steps generated by the transmitter 30 in a 1000BASE mode of operation. The transmitted clusters 100, 105 are organized in a unary type architecture to improve the linearity of the transmitted signal. All clusters are connected to the same hybrid output nodes 110. The transmitter 30 also contains additional sets of least significant 10BASE-T driver cells 115, 120. They are necessary to produce a smooth sine-like waveform required in this standard. All clusters 100, 105 and cells 115, 120 are connected to the same transmitter output nodes 125.

Figure 4:
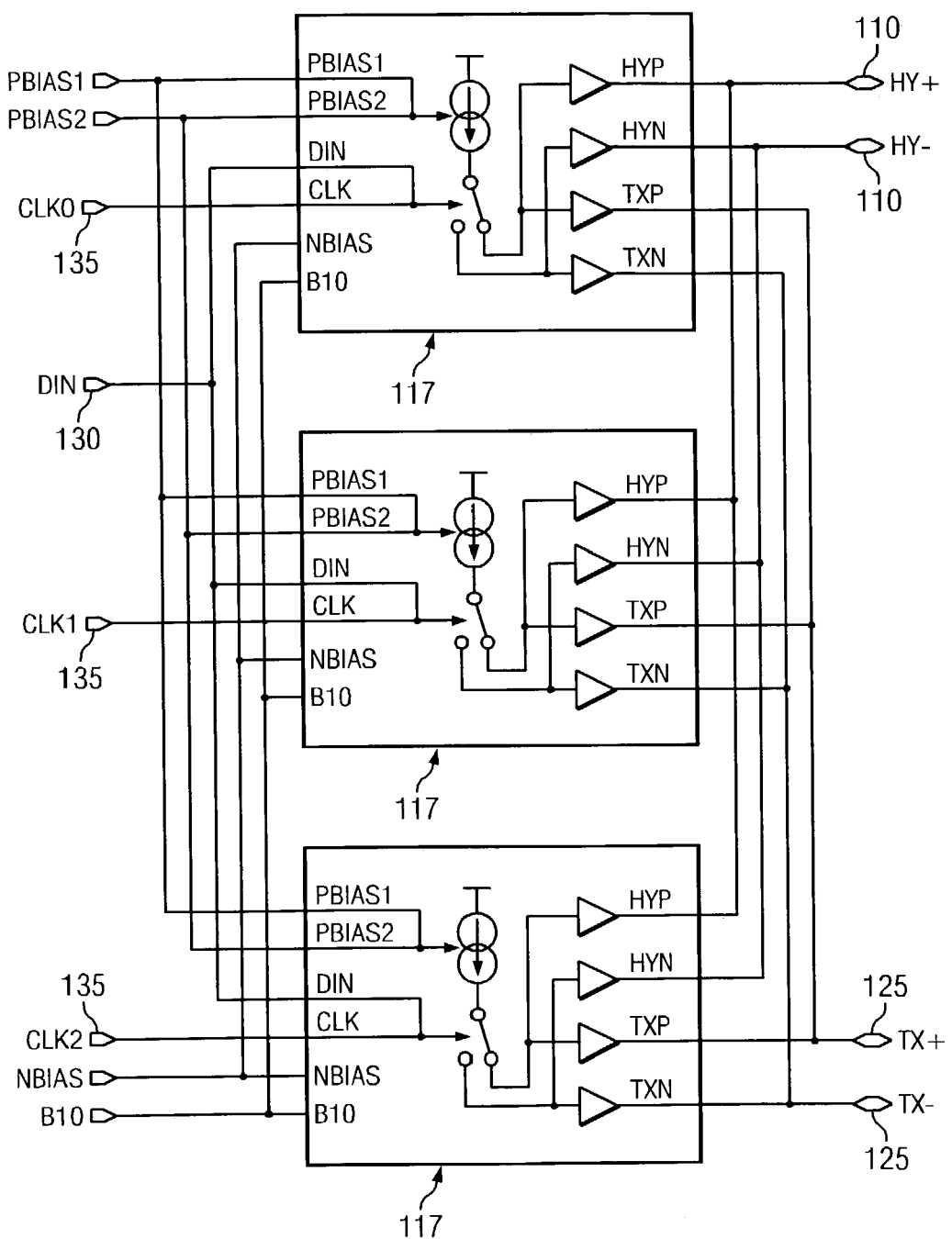
FIG. 4 is a block diagram of a transmitter cell cluster used in 1000BASE-T 100BASE-TX, and 10BASE-T modes.

The block-diagram of a transmitter cell cluster 100, 105 used in 1000BASE-T and 100BASE-TX modes is shown in FIG. 4. The cluster 100, 105 contains three identical transmitter cells 117 receiving the same data bit 130. The cells 117 are controlled by individual clock phases 135. This is done to achieve the required 1000BASE-T standard wave shape. All cells 117 are connected to the same transmitter output nodes 125 and the same hybrid output node 110.

Figure 5:
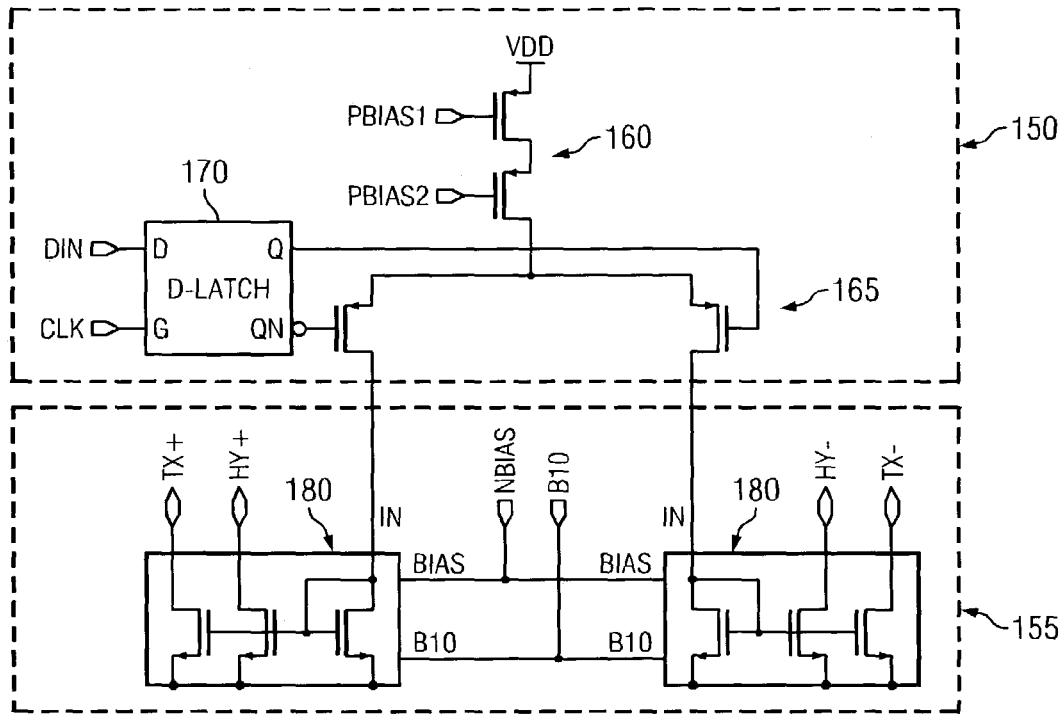
FIG. 5 is a block diagram of a transmitter cell of a cluster as illustrated in FIG. 4.
Figure 6:
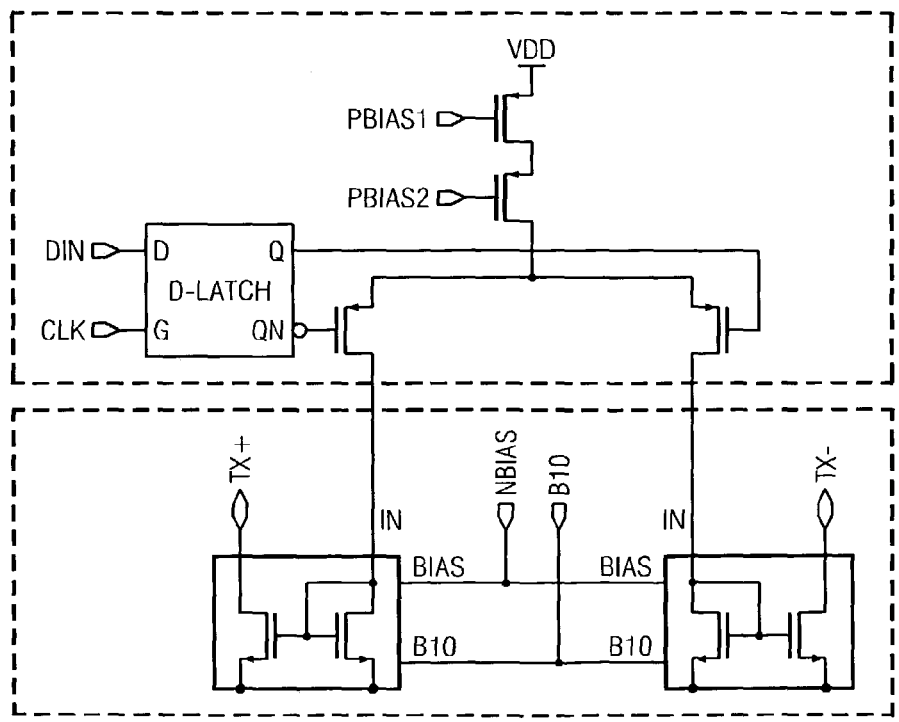
FIG. 6 illustrates a 10BASE-T least significant bit transmitter cell.

The block-diagram of a transmitter cell 117 of the cluster 100, 105 is shown in FIG. 5. The cell 117 contains Digital-to-Analog Converter (DAC) portion 150 and current mirror driver portion 155. The DAC portion 150 consists of a DC current source 160 connected to the constant bias voltages PBIAS1 and PBIAS2, and current switch 165 controlled by D-latch 170. Driver portion 155 of the cell 117 consists of two identical current mirror driver cells 180. 10BASE-T least significant bit transmitter cell, shown in FIG. 6, is built in similar way. This cell does not have hybrid outputs, which are not used in 10BASE-T standard. As well as this cell needs only a single clock phase used in 10BASE-T mode.

Figure 7:
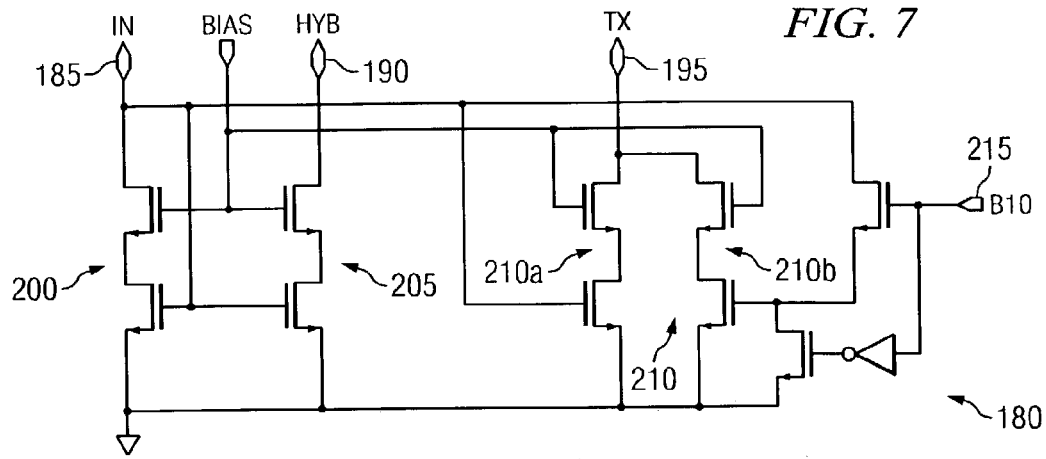
FIG. 7 illustrates a simplified basic circuit diagram of a current driver cell.

A simplified basic circuit diagram of current mirror driver cell 180 is shown in FIG. 7. The driver cell 180 has current mirror architecture with current input 185 and two current outputs 190 and 195. The cell 180 contains input current path 200 connected to current input 185, hybrid current path 205 connected to output 190 and transmitter current path 210 connected to output 195. The current gain of the transmitter portion of the mirror is substantially higher than one. Path 210 contains two portions: 210a is always active, 210b is enabled only in 10BASE-T mode by signal 215 to increase the current gain of the driver in this mode.

The main difference of the transmitter 30 described from the one used in the first prior art example is that each individual transmitter cell 117 of the clusters 100, 105 contains a DAC 150 portion and a current mirror driver portion 155, which in turn contains both driver and active hybrid current paths 205, 210. The described structure enables the transmitted signal to be filtered at the driver input and save substantial chip area. Because the hybrid signal path 205 is controlled by exactly the same filtered input voltage as the driver path 210, good high frequency hybrid-driver matching can be achieved.

The difference from the second prior art example is each driver cell 180 still consists of a current mirror driver 155 with the driver path and hybrid replica path with inherent dynamic non-linear distortions, this does not affect the non-linear distortions of the transmitter-hybrid operation. This is because the trajectories of the transmitter output signal are the same in all the transmitter clusters. If it necessary to transmit a signal with higher amplitude, a larger number of identical transmitter clusters are involved. Thus, the trajectories are always proportional and are not dependent on the signal amplitude. The non-linear distortion of the transmitter and hybrid will be only determined by the accuracy of the identical transmitter clusters matching.

Figure 9:
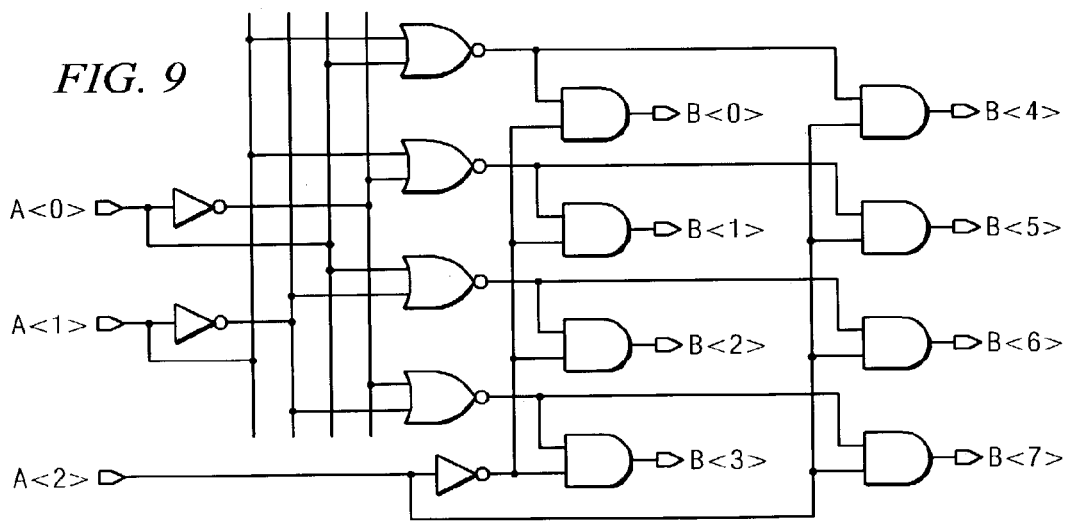
FIG. 9 is a block diagram of a decoder for use with the hybrid of FIG. 8.
Figure 8:
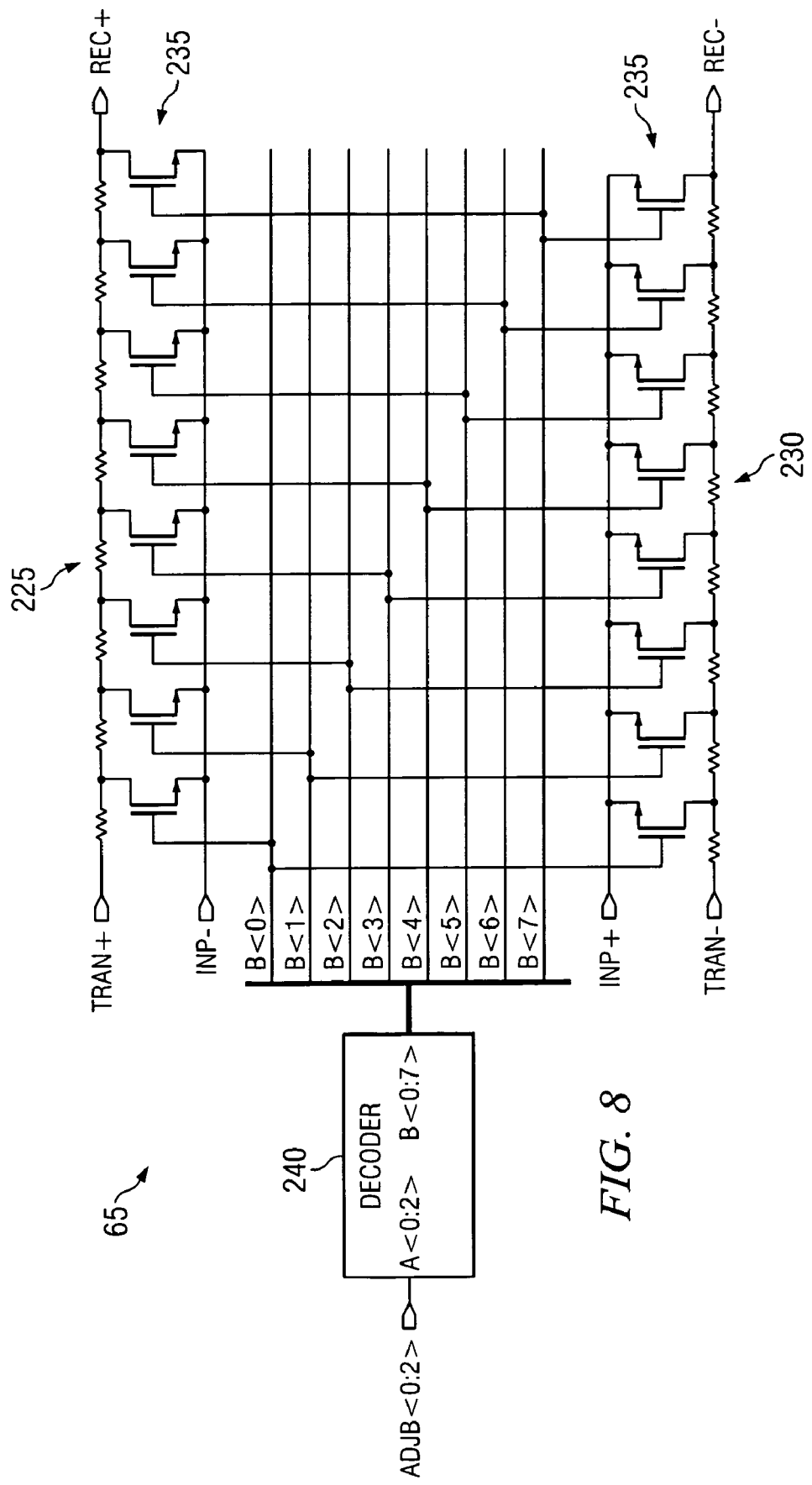
FIG. 8 illustrates a first embodiment of a hybrid.

One possible embodiment of the hybrid 65 is presented in FIG. 8. The hybrid 65 contains two resistor strings 225 and 230 connected between differential transmitters outputs and hybrid outputs connected to the receiver input. The taps of the resistor string 225, 230 are connected to the differential hybrid inputs (these inputs are connected to the hybrid output of the transmitter) through transistor switches 235. Only one pair of the switches 235 can be simultaneously selected by decoder 240. The input of the decoder 240 is generated by the hybrid tuning block 75 shown in FIG. 11. This block 75 chooses the switch 235 in such a way that the part of the resistor strings 225 and 230 located to the left from the chosen tap has a predetermined value of resistance. In this case, the current coming from the hybrid output of the transmitter 30 will provide the best compensation of the transmitted signal at the receiver input. The decoder block-diagram is shown in FIG. 9. It decodes a three bit input code into eight output signals.

Figure 10:
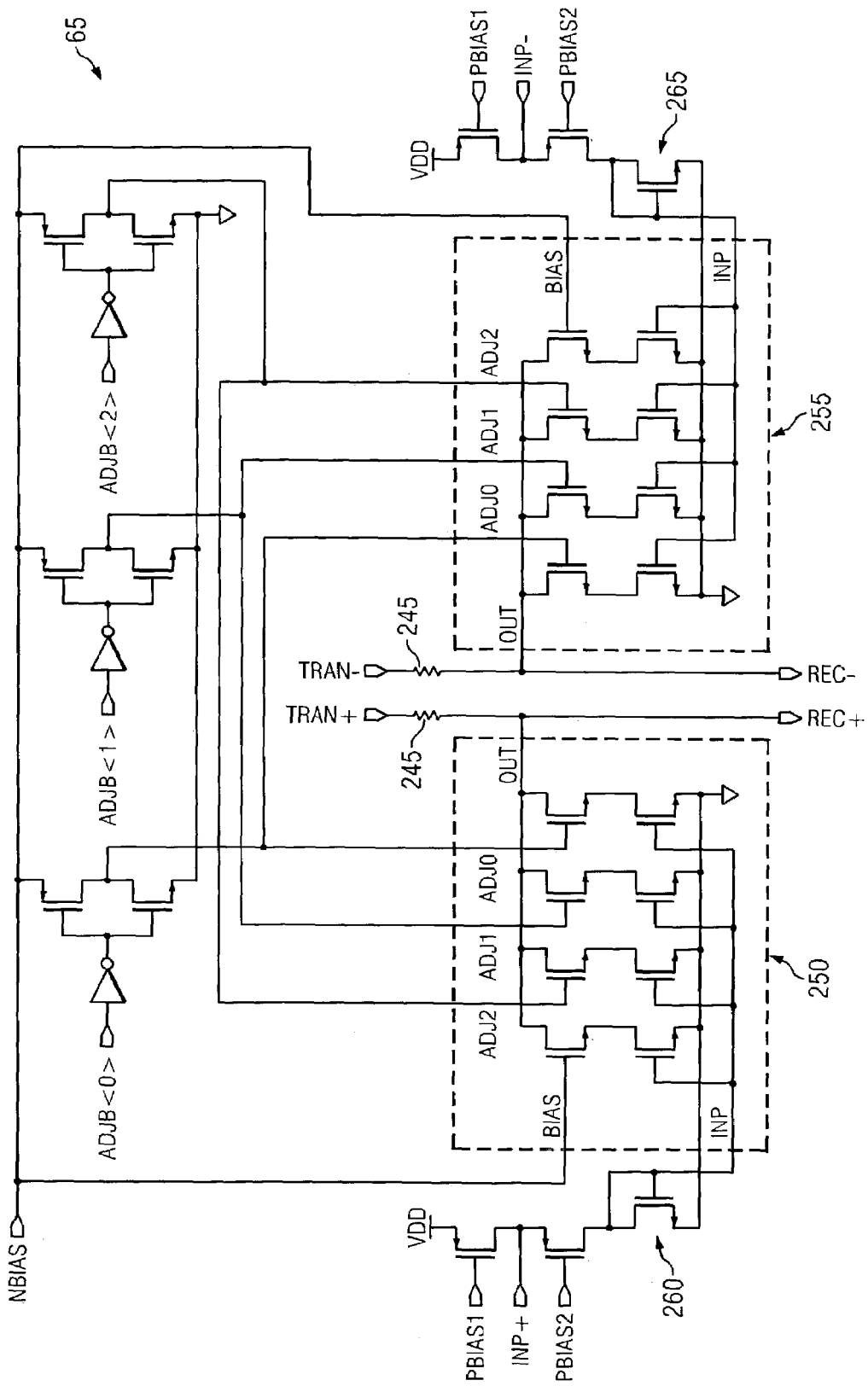
FIG. 10 illustrates a further embodiment of a hybrid.

Another possible embodiment of the hybrid 65 is shown in FIG. 10. The hybrid 65 contains a pair of resistors 245 coupling the transmitter output with the receiver. In this embodiment instead of adjustable resistors, the value of the compensation current is adjustable. This is done by activating appropriate paths in current mirror slave transistors 250 and 255 receiving the bias voltage from master transistors 260 and 265 of the current mirror. The control bits ADJB<0: 2> are generated to match the compensation gain of the current mirror to the actual value of the resistors 245. Although the current mirror may introduce some dynamic distortions to the signal, the value is substantially smaller than the one that can be possible produced by the current mirror driver. This is because the current mirror gain in this case is smaller than one. As well as due to small current consumption of the hybrid compared to driver, the operating current of the hybrid current mirror can be substantially increased without affecting the power efficiency.

Figure 11:
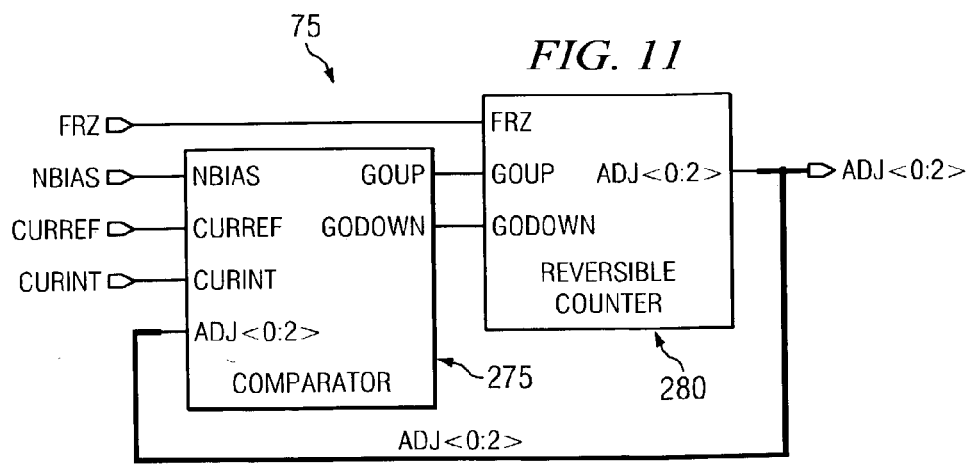
FIG. 11 is a block diagram of a hybrid tuning block.

The hybrid tuner 75 block diagram is shown in FIG. 11. The hybrid tuner 75 contains comparator 275 and reversible counter 280. The comparator 275 receives two input currents from the bias generator 85 (FIG. 1). One current "CURREF" is temperature and process independent. The other "CURRINT" is generated using a stable reference voltage and internal for the chip resistors. Thus, this current value is reverse proportional to the chip resistor's actual value. The comparator 275 receives the tuning bits ADJ<0:2> from the counter 280. If the code of the bits corresponds to the best matching of the hybrid 65, both outputs of the comparator are low. If the bits should be changed, the comparator 275 produces either "GOUP" or "GODOWN" for the counter 280 according to the direction for the code to be changed. The reversible counter 280 changes its output until the comparator 275 conditions are satisfied.

Figure 12:
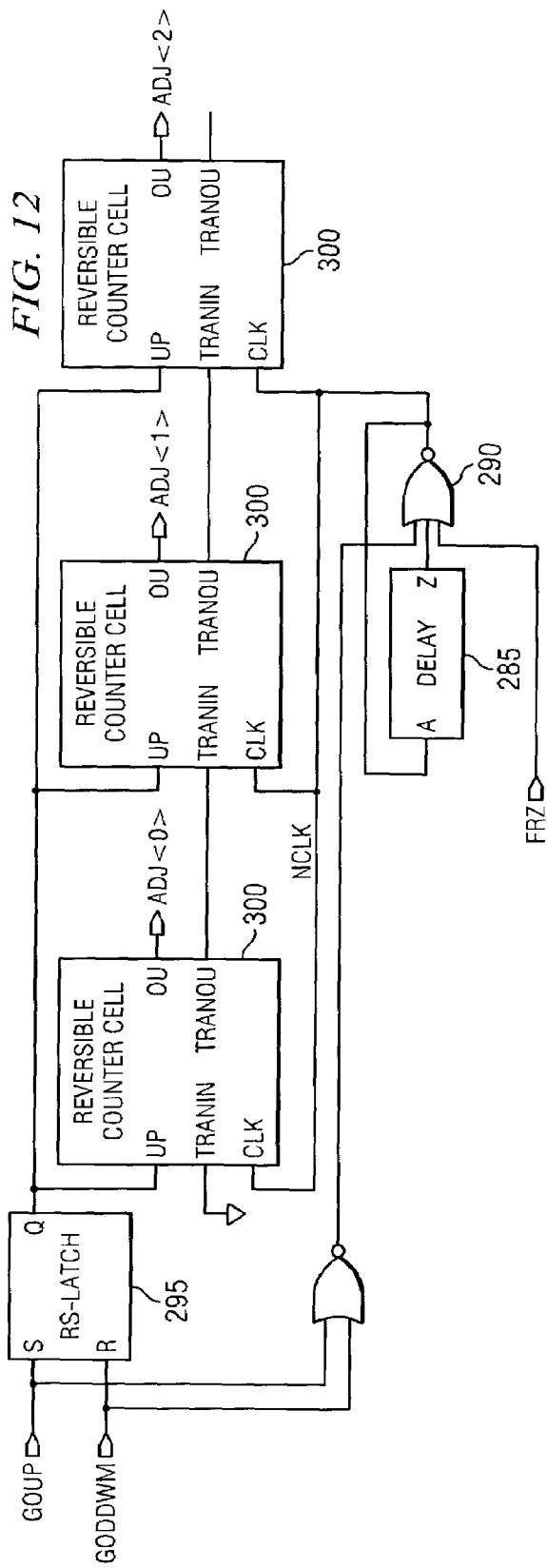
FIG. 12 is a block diagram of a reversible counter.
Figure 14:
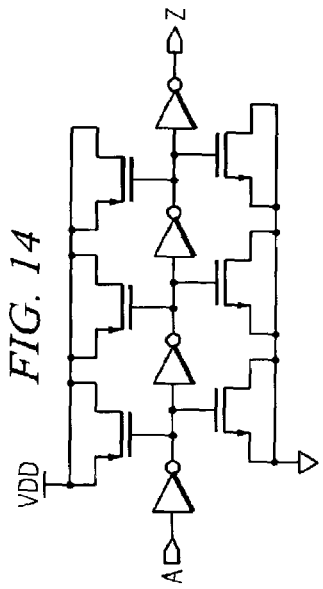
FIG. 14 is a block diagram of a delay line.
Figure 13:
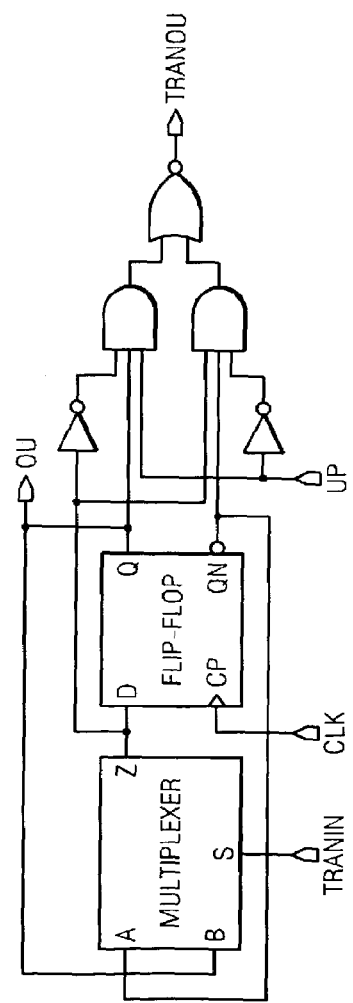
FIG. 13 is a block diagram of an up/down counter cell.

The reversible counter 280 block diagram is shown in FIG. 12. The reversible counter 280 contains delay 285, which together with NOR gate 290 composes a ring oscillator, RS-latch 295, stores the direction of the count; and set of the counter cells 300. If both signals "GOUP" and "GODOWN" are low, the ring oscillator 300 is disabled. The counter output in this case remains unchanged. If either of the inputs goes "HIGH", the ring oscillator 300 is enabled. The clock cycles are counted either upward or downward until both inputs return to "LOW." The block diagrams of the up/down counter cell 280 and delay line 285 are shown in FIGS. 13 and 14 respectively.

Figure 15:
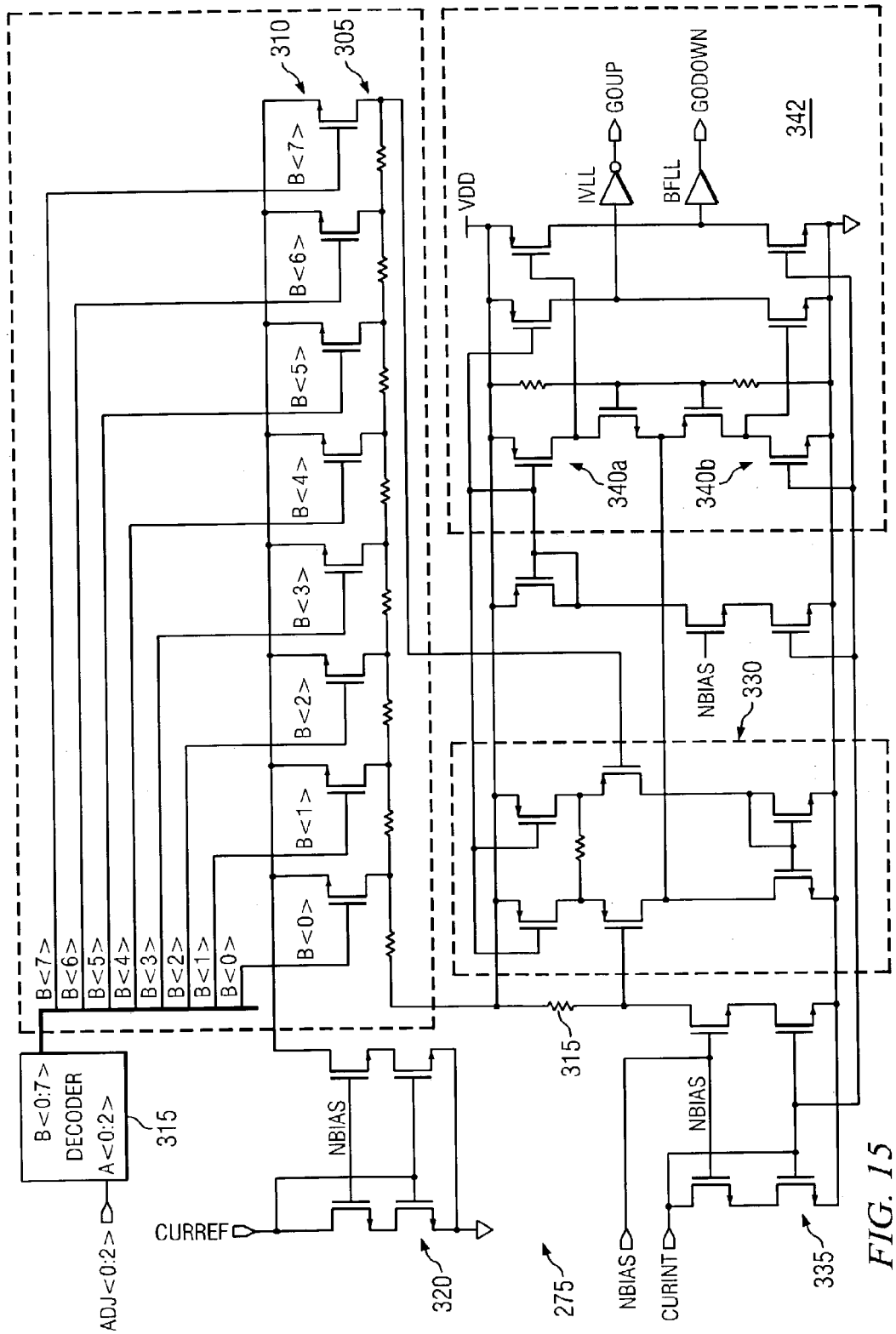
FIG. 15 is a schematic of a comparator used with the first embodiment of the hybrid illustrated in FIG. 8.

The schematic of the comparator 275 used for the first embodiment of the hybrid 65 (FIG. 8) is shown in FIG. 15. The comparator 275 contains a replica of the hybrid resistor string 305 with switches 310 connected to the resistor taps. The switches 310 are controlled by a decoder 315 similar to decoder 240 (FIG. 9). The selected switch applies a process independent current generated by current mirror 320 to the respective part of the resistor string 305. A process dependent current generated by current mirror 335 is applied to resistor 315 to create a reference voltage drop across the resistor. Transconductor cell 330 converts the voltage difference between the reference resistor 315 and the resistor string 305 in its output current applied to the current comparator 342. The limits of the comparator are set by current sources 340*a* and 340*b*. If the transconductor current exceeds the limit, either "GOUP" or "GODOWN" goes "HIGH".

Figure 16:
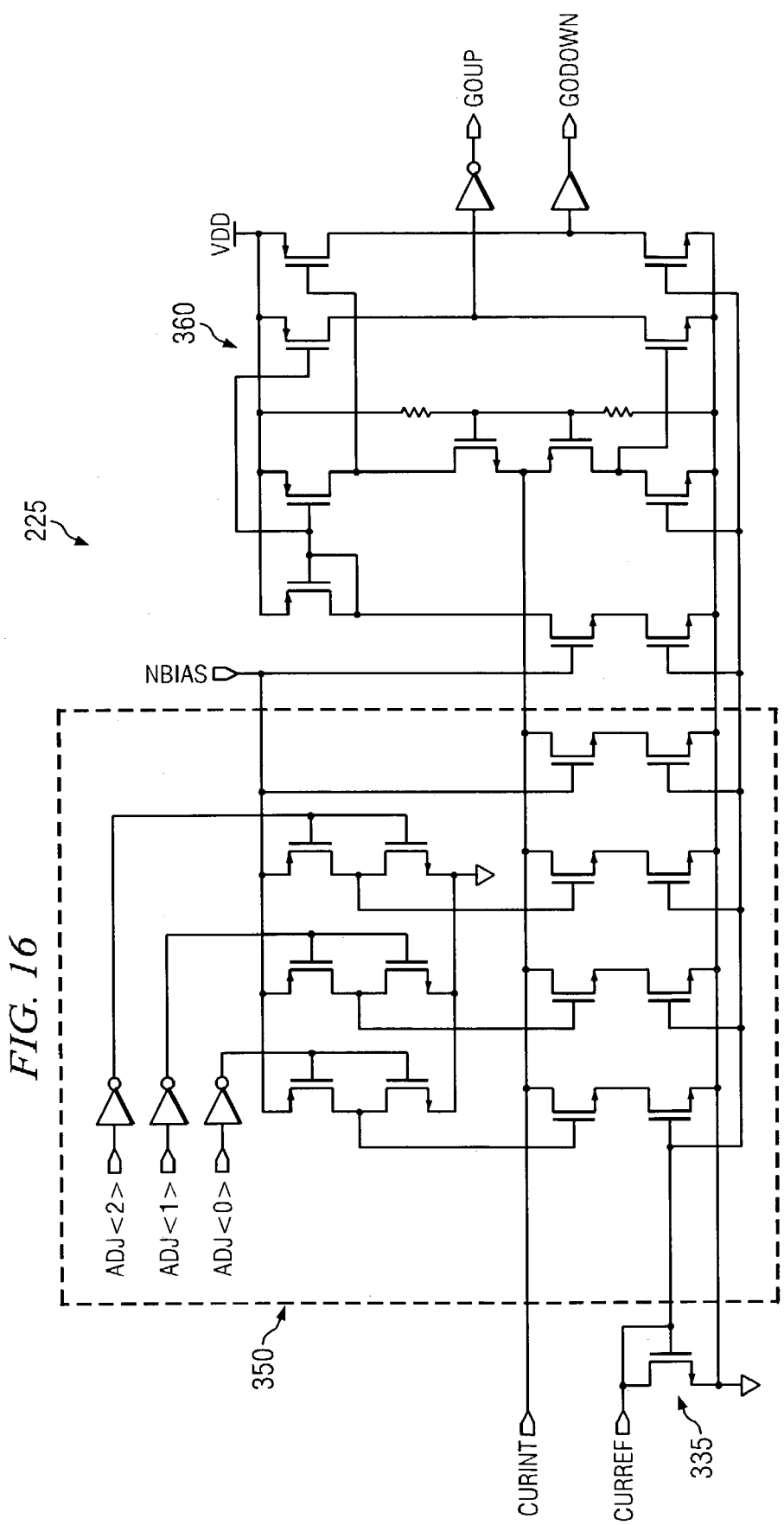
FIG. 16 is a schematic diagram of a comparator used with the second embodiment of the hybrid illustrated in FIG. 10.

The schematic of the comparator 275 used for the second embodiment of the hybrid 65 (FIG. 10) is shown in FIG. 16. The comparator 275 contains a replica 350 of a hybrid cell. The replica 350 (presents the slave side) and master transistor 355 composes a current mirror, which receives a reference process independent current "CURREF". A process dependent current "CURRINT" is applied to the drain node of replica 350. Tile current difference is applied to current comparator 360, which was described above.

Figure 17:
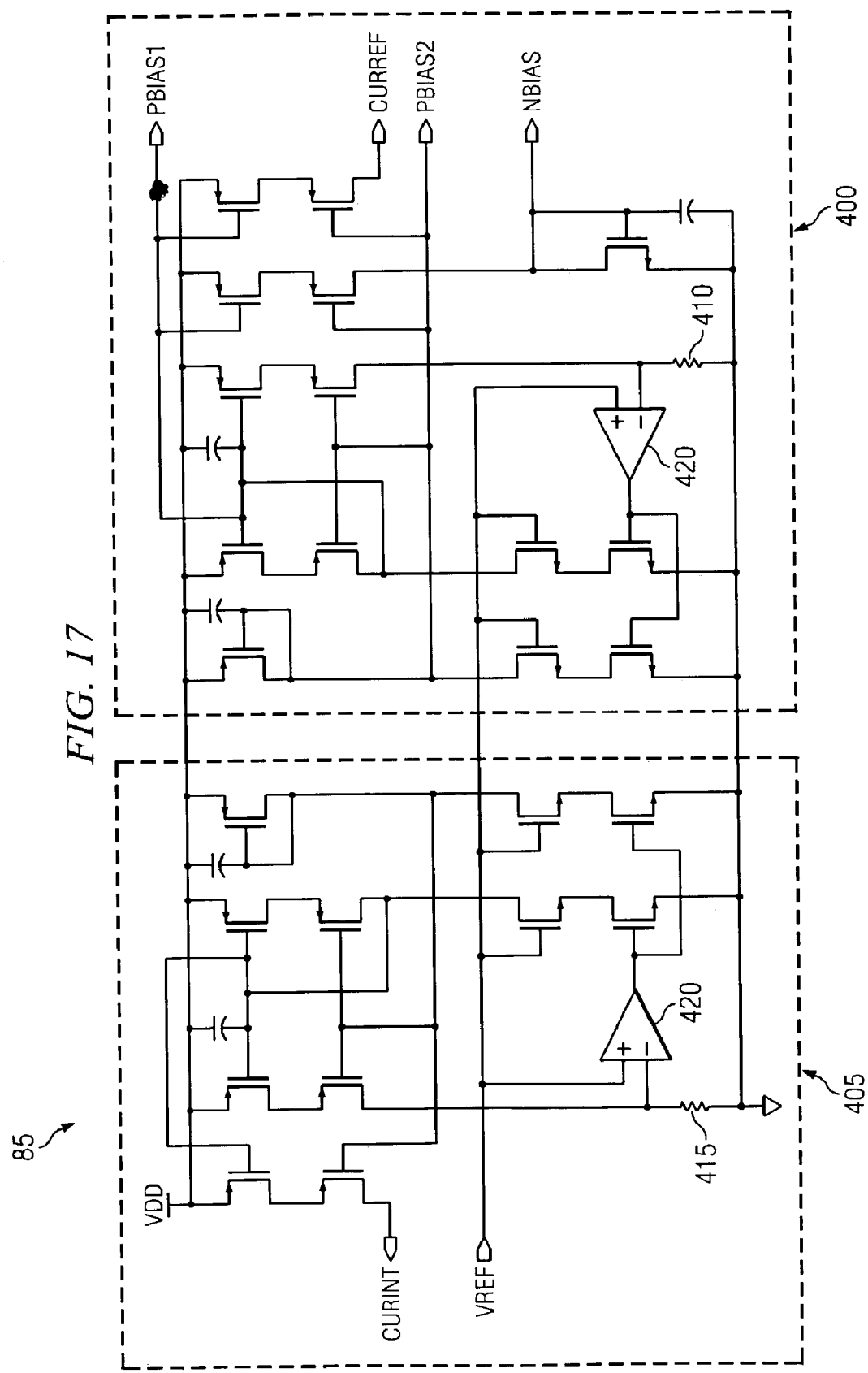
FIG. 17 is a circuit diagram of a bias generator.

The bias generator 85 circuit diagram is shown in FIG. 17. The bias generator 85 contains two similar portions: portion 400, which is responsible for generation of the process independent reference voltages and currents; and portion 405 responsible for generation of the process dependent current. They contain external precise resistor 410, connected to an n external pin of the chip, and internal process dependent resistor 415. Each portion 400, 405 contains an operational amplifier 420 connected in a loop with a current source 425 and to the respective resistor 410, 415. The loop maintains the voltage drop across the resistor 430 equal to the input reference voltage. Hence, the output currents of the portions 400, 405 are reverse proportional to the respective resistor values. At the same time portion 400 generates the bias voltages used by other blocks of the transceiver.

The previous description is of a preferred embodiment for implementing the invention, and the scope of the invention should not necessarily be limited by this description. The scope of the present invention is instead defined by the following claims.

What is claimed is:

1. A gigabit ethernet line driver, comprising:
 a transmitter having both an analog differential transmitter output and an analog differential active hybrid output, comprising:
  a plurality of transmitter clusters each connected to both the transmitter and the active hybrid outputs;
  a plurality of transmitter cells within each of the plurality of transmitter clusters, each transmitter cell further comprising:
   a driver cell including positive and negative current mirror circuits for generating a differential analog transmit signal and a differential analog active hybrid signal which is a current mirrored copy of the differential analog transmit signal, the differential analog transmit signal and differential analog active hybrid signal being connected to the analog differential transmitter output and analog differential active hybrid output, respectively; and
   a digital to analog converter connected to the driver cell, the converter comprising a source of constant current and a switching circuit operating to switch the constant current between the positive and negative current mirror circuits in response to a transmit data bit value;
 a hybrid circuit connected between transmitter outputs and receiver inputs and receiving the active analog hybrid output, the hybrid circuit operating to separate a receiver signal from a transmitter signal responsive to a tuning signal and the received active analog hybrid output;
a hybrid tuner for providing the tuning signal.

2. The line driver of claim 1, wherein the transmitter further comprises a plurality of 10BASE-T driver cells for providing a differential signal having a smooth sine-like waveform which is applied to the analog differential transmitter output.

3. The line driver of claim 1, wherein the digital to analog converter further comprises a latch for receiving the transmit data bit value and controlling the switching circuit.

4. The line driver of claim 1, wherein each of the positive and negative current mirror circuits of the driver cell comprises a pair of output current paths, one of which provides the analog transmit signal and the other provides the analog active hybrid signal.

5. The line driver of claim 1, wherein the hybrid further comprises:
first and second resistor strings connected between the receiver inputs and the transmitter outputs, the first and second resistor strings each comprising a plurality of resistors with taps on each of the resistors;
a plurality of transistor switches connecting the taps of each of the first and second resistor strings to the hybrid inputs; and
a decoder for selecting a pair of the plurality of transistor switches connecting to a particular tap such that a current to compensate for a transmitted signal is provided at the receiver inputs.

6. The line driver of claim 1, wherein the hybrid further comprises:
first and second resistors connecting the transmitter outputs to the receiver inputs;
first and second current mirror slave transistors coupled to the receiver input and each of the first and second resistors for providing an adjustable compensation current responsive to a control signal.

7. A gigabit ethernet line driver, comprising:
a transmitter having both transmitter and active hybrid outputs, comprising:
a plurality of transmitter clusters each connected to both the transmitter and the active hybrid outputs;
a plurality of transmitter cells within each of the plurality of transmitter clusters, each transmitter cell further comprising:
a driver cell;
a digital to analog converter connected to the driver cell;
a hybrid circuit connected to the transmitter outputs for separating a receiver signal from a transmitted signal responsive to a tuning signal, wherein the hybrid further comprises:
first and second resistor strings connected between the receiver inputs and the transmitter outputs, the first and second resistor strings comprising a plurality of resistors;
a plurality of transistor switches connecting the taps of each of the first and second resistor strings to the hybrid inputs;
a decoder for selecting a pair of the plurality of transistor switches connecting to a particular tap such that a current to compensate for a transmitted signal is provided at the receiver inputs; and
a hybrid tuner for providing the tuning signal.

8. The line driver of claim 7, wherein the transmitter further comprises a plurality of 10BASE-T driver cells for providing a smooth sine-like waveform.

9. The line driver of claim 7, wherein the digital to analog converter further comprises:
a DC current source;
a current switch connected to the DC current source; and
a latch for controlling the current switch.

10. The line driver of claim 7, wherein the driver cell further comprises a pair of current mirrors each independently connected to the digital to analog converter.

11. The line driver of claim 10, wherein each of the pair of current mirrors of the driver cell further comprises a pair of output current paths, one of which is connected to the transmitter driver output and the other connected to the hybrid transmitter output.

12. A gigabit ethernet line driver, comprising:
a transmitter having both an analog differential transmitter output and an analog differential active hybrid output, comprising:
a plurality of transmitter clusters each connected to both the transmitter and the active hybrid outputs;
a plurality of transmitter cells within each of the plurality of transmitter clusters, each transmitter cell further comprising:
a driver cell including positive and negative current mirror circuits for generating a differential analog transmit signal and a differential analog active hybrid signal which is a current mirrored copy of the differential analog transmit signal, the differential analog transmit signal and differential analog active hybrid signal being connected to the analog differential transmitter output and analog differential active hybrid output, respectively; and
a digital to analog converter connected to the driver cell, the converter comprising a source of constant current and a switching circuit operating to switch the constant current between the positive and negative current mirror circuits in response to a transmit data bit value.

13. The line driver of claim 12, wherein the transmitter further comprises a plurality of 10BASE-T driver cells for providing a differential signal having a smooth sine-like waveform which is applied to the analog differential transmitter output.

14. The line driver of claim 12, wherein the digital to analog converter further comprises a latch for receiving the transmit data bit value and controlling the switching circuit.

15. The line driver of claim 12, wherein each of the positive and negative current mirror circuits of the driver cell comprises a pair of output current paths, one of which provides the analog transmit signal and the other provides the analog active hybrid signal.

* * * * *